May 11, 1943. M. E. HANSON 2,319,130
REFRIGERATION CONTROL FOR AIR CONDITIONED PASSENGER VEHICLES
Filed March 5, 1941
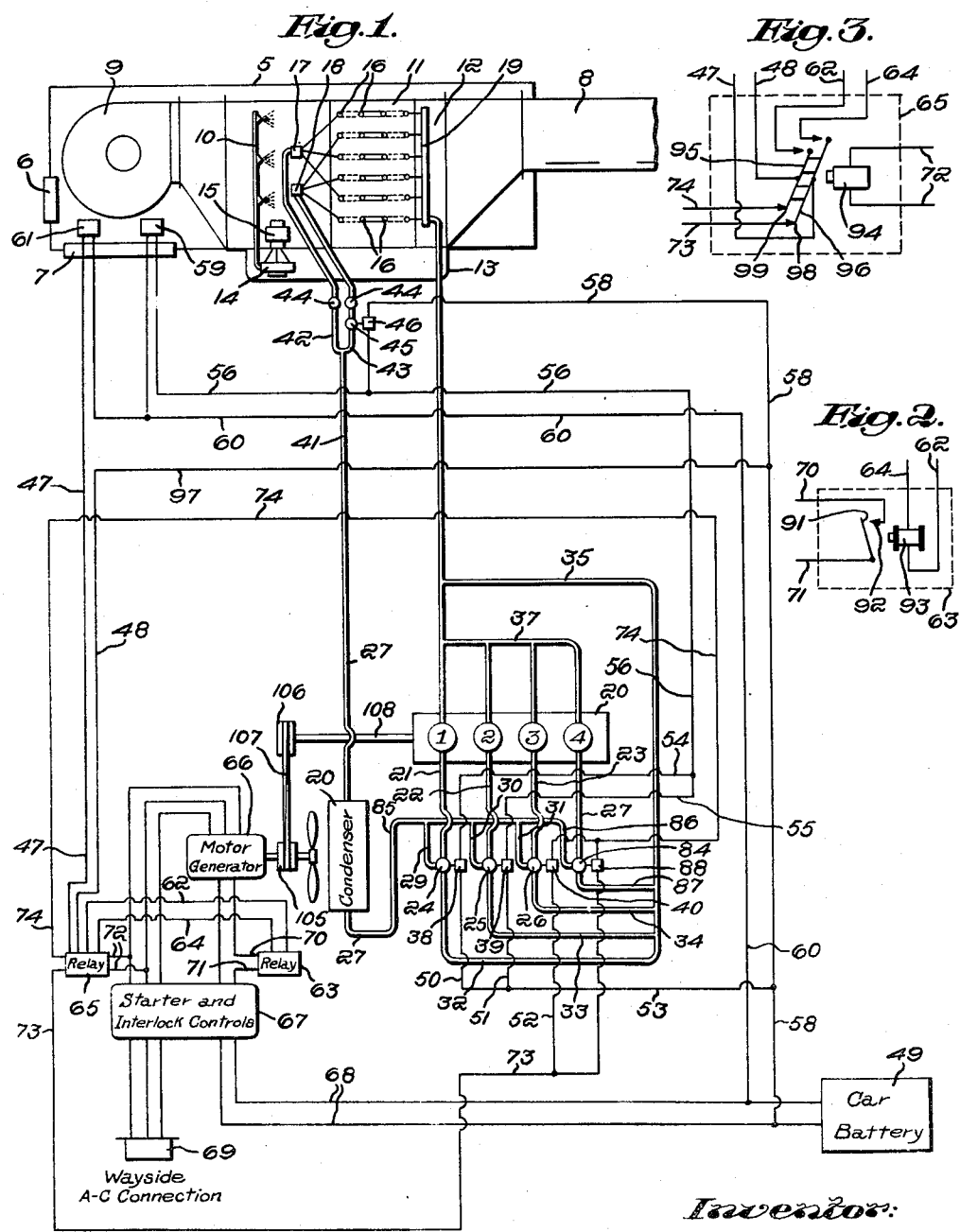
Inventor:
Milton E. Hanson,
by Robert T. Palmer
Attorney Patented May 11, 1943

2,319,130

UNITED STATES PATENT OFFICE 2,319,130

REFRIGERATION CONTROL FOR AIR CONDITIONED PASSENGER VEHICLES

Milton E. Hanson, Haddonfield, N. J., assignor to B. F. Sturtevant Company, Boston, Mass.

Application March 5, 1941, Serial No. 381,832

4 Claims. (Cl. 62—6)

This invention relates to refrigeration apparatus for providing air cooling and relates more particularly to controls for refrigeration apparatus for air cooled, railway passenger cars.

It has been the practice in air conditioned passenger cars to energize an electric motor driving a refrigerant compressor, from the car battery during the normal motion of the cars, and during station stops or for precooling, to utilize way-side alternating current, electric energy for energizing the equipment. The compressor motor is provided with A. C. and with D. C. windings and when the way-side connections are plugged in, the motor is operated by the alternating current and the D. C. windings are used to provide D. C. for charging the car battery. In such prior systems, the car thermostat started and stopped the compressor motor and switched from A. C. control to D. C. control when the wayside connections were removed, and vice versa.

Controlling the temperature in the car by cycling the compressor has resulted during the off cycles of the compressor, in rises in relative humidity due both to the absence of any dehumidification, and to the reevaporation of moisture from the commonly used, direct expansion evaporator tubes, which was condensed thereon during the on cycles of the compressor. To overcome the undesired rises in relative humidity, it has been proposed to operate the compressor continuously and to reheat the air before delivery by steam heaters controlled by dry bulb thermostats in the passenger spaces or in the recirculated air passages. The operating cost of such an expedient is believed to be out of all proportion to the benefit gained.

This invention provides for a graduated control of the operation of the refrigeration apparatus by controlling the surface area of the air cooling evaporator and by unloading cylinders of a multiple cylinder, refrigerant compressor. The refrigerating effect varies conformably with the load so that cycling of the compressor is reduced and with refrigeration provided substantially all of the time.

To provide for continuous battery charging during station and yard stops without overcooling the car, a car thermostat, instead of stopping the compressor motor, which at such a time is acting to charge the battery, acts to unload all cylinders of the compressor, thus causing it to float on the line without substantial energy consumption.

Objects of the invention are to provide for graduated control of the refrigeration supplied to air cooling evaporators in a railway passenger car, and to provide that the electric equipment associated with the refrigeration apparatus, continuously charge the car batteries when energized from wayside connections, regardless of the refrigeration effect required.

The invention will now be described with reference to the drawing of which:

Fig. 1 is a diagrammatic view of one embodiment of the invention;

Fig. 2 is a view showing the circuit details of the relay of Fig. 1 controlling the compressor motor, and Fig. 3 is a view showing the circuit details of the relay of Fig. 1 which switches the low limit thermostat from control of the compressor motor to control of unloading cylinders of the compressor.

The overhead casing 5 has the fresh air inlet 6, the recirculated air inlet 7 and the duct 8 extends therefrom for the distribution of the conditioned air.

The casing 5 contains the fan 9, the spray header 10, the evaporator 11 and the eliminator 12. The sump 13 below the spray header 10 and the evaporator 11, contains the pump 14 driven by the motor 15. The pump 14 and the sump 13 are disclosed in detail in the M. E. Hanson Patent No. 2,189,731 of Feb. 6, 1940. The spray header 10 is connected to the discharge of the pump 14 and sprays water upon the evaporator 11, the water being continuously recirculated by the pump. The eliminator 12 which may be of the usual vertical zig-zag plate type collects entrained moisture from the air and returns it to the sump. The water sprayed upon the evaporator is cooled by the contact therewith and acts to aid in the cooling and dehumidifying of the air as well as to wash it. The sprays also keep the evaporator surface clean.

The evaporator illustrated is of the type having closely spaced vertical fins, each fin contacting every evaporator tube. In the embodiment illustrated, the tubes 16 are arranged four rows deep and 6 rows high. Other arrangements could, of course, be used. The evaporator 11 is divided into two separate sections by the refrigerant distributors 17 and 18. These distributors are preferably of the type of the Morton Patent No. Re. 20,964. The distributor 17 supplies refrigerant to the odd numbered tubes of the first vertical row (with respect to air flow) while the distributor 18 supplies refrigerant to the even numbered tubes of the same row. The tubes in the horizontal rows are connected as usual in series and to the common discharge header 19.

The refrigerant compressor 20 has four cylinders numbered 1, 2, 3, and 4, these cylinders being adapted to be unloaded as will be explained. The outlets of the cylinders numbers 1, 2, 3, and 4 are connected by the tubes 21, 22, 23 and 27 respectively to the three way valves 24, 25, and 26 and 84 respectively. The valves 24, 25, 26, and 84 are also connected to the common discharge tube 85 by the branch tubes 29, 30, 31 and 86 respectively. The valves 24, 25, 26, and 84 are also connected by the tubes 32, 33, 34 and 87 respectively to the by-pass tube 35 which connects into the tube 36 which connects the header 19 of the evaporator 15 with the suction header 37 of the compressor 20. The valves 24, 25, 26 and 84 are adjusted by the solenoids 38, 39, 40 and 88 respectively to unload the cylinders of the compressor as will be explained.

The refrigerant from the compressor, when not unloaded, passes through the tube 85 into the condenser 20 and then through the tube 41 to the tubes 42 and 43 which lead to the distributors 17 and 18 respectively. The similar expansion valves 44 are connected in the tubes 42 and 43. The tube 43 also contains the valve 45 which is opened and closed by the solenoid 46 as will be explained.

The solenoids 38 and 39 are connected at one side by the wires 50 and 51 and the wire 53 to one side of the car battery 49. The solenoids 40 and 88 are connected at one side to the wire 73 leading to the relay 65 and at their other side by the wire 74 which leads to the relay 65. The solenoids 38 and 39 are connected at one side by the wire 50, 51, and 53 to one side of the car battery 49 and are connected at their other side by the wires 54, 55, and 56 to one side of the solenoid 46 which adjusts the valve 44 in the tube 43 supplying refrigerant to a section of the evaporator as will be described.

The other side of the solenoid 44 is connected by the wire 58 to one side of the battery 49 to which the other sides of the solenoids 38 and 39 are connected by the wire 53. The thermostat 59 in the recirculated air entering the inlet 7, is connected by the wire 56 to the solenoids 38, 39, and 46. The other side of the thermostat 59 is connected by the wire 60 to the battery 49. The solenoids 38, 39, and 46 are seen to be connected in parallel with each other and in series with the battery 49 and the thermostat 59. As will be explained, the thermostat acts to control the solenoids 38 and 39 to unload cylinders numbers 1 and 2 of the compressor and to control the solenoid 46 to render inactive a portion of the evaporator when the passenger space has been cooled to the desired temperature.

The thermostat 61 which is a low limit thermostat has one side connected in series with the battery 49 by the wires 60, 58 and 97 and is connected by the wires 48 and 48 to the relay 65, and through the relay 65 to the relay 63 and to the energizing circuit of the solenoids 40 and 88. When the car is moving and the system operating from the battery, the thermostat 61 acts to start and stop the compressor. When the way side connections are completed, the thermostat 61 acts to control the solenoids 40 and 88 to unload cylinders 3 and 4 of the compressor when the low limit temperature is reached causing, since the cylinders 3 and 4 would be unloaded at that time, the compressor to operate with all cylinders unloaded while the battery is being charged by the motor-generator 66.

The operating contacts of the relay 63 connect the motor-generator 66 through the starter and interlock controls 67 to the battery 49. The details of the starter and interlock controls 67 are shown by Figs. 2 of the U. S. Patent No. 1,985,639 to C. F. King, Jr. and so will not be described in detail here. It is believed to be sufficient to state herein that they are provided for segregating the A. C. and D. C. currents so that the motor-generator can act as a D. C. generator when the way-side connections are plugged in.

The motor generator 66 drives the compressor 20 through the pulleys 105 and 106, the belt 107 and the compressor shaft 108.

The details of the relay 63 are shown by Fig. 2. Its contacts 91 and 92 are in series in the D. C. energizing circuit of the motor-generator 66 and are separated when the thermostat 61 responds to the low limit temperature and when the system is operating on D. C. when the car is moving. When the way-side connections are plugged in and the system is operating on A. C., the relay 65 acts to deenergize the solenoid 93 of the relay 63 so that the thermostat 61 cannot act to energize the solenoid as will be explained.

The details of the relay 65 are shown by Fig. 3. When the system is operating on A. C. the solenoid 94 is energized and pulls up its armatures 95 and 96 as illustrated. The wires 47 and 48 from the thermostat 61 are connected to the armatures which operate as a double-pole, double-throw switch to position the thermostat 61 to control the solenoids 40 and 88 as illustrated, or to control, through the relay 63, the motor-generator 66. In the position illustrated, the system is operating from A. C.; the solenoid 94 is energized and the armatures 95 and 96 strike the contacts 98 and 99 respectively connected to the wires 73 and 74 which lead to the solenoids 40 and 88, applying current from the battery to the solenoids 40 and 88 when the contacts of the thermostat 61 are closed, causing the solenoids 40 and 88 to be energized and to maintain the cylinders 4 and 5 of the compressor in operation through closing off the by-pass tubes and by opening the tubes 86 and 31 to the condenser. When the low limit temperature which, for example, may be 71° F., is reached, the contacts of the thermostat 61 open; the solenoids 40 and 48 are deenergized, and the cylinders 3 and 4 are unloaded.

At the same time, through the armatures 95 and 96 having left the contacts 100 and 101 which are connected to the wires 62 and 64 respectively, leading to the relay 63, the thermostat 61 is disconnected from the control of the relay 63 and through it, of the motor-generator 66 so that so long as the way-side connections are plugged in, the motor-generator 66 will continue operating as a generator to continuously charge the battery 49. When the way-side connections are removed, the solenoid 94 of the relay 65 becomes deenergized, the armatures 95 and 96 leave the contacts 98 and 99 and strike the contacts 100 and 101. This disconnects the thermostat 61 is disconnected from control of the 88 and connects it to the relay 63. Then when the low limit temperature is reached, the energizing circuit including in series, the thermostat 61, the battery and the solenoid 93 is opened causing the contacts 91 and 92 to separate as illustrated and to deenergize the motor-generator.

The thermostat 59 operates in the same way to control the active evaporator surface and the unloading of cylinders 1 and 2 of the compressor regardless of whether the system is operating on A. C. or D. C. When the recirculated air temperature is above, say for example, 75° F., the contacts of the thermostat 59 are open; the cylinder unloading solenoids 38, 39 and the evaporator control solenoid 46 are not energized with the result that all cylinders of the compressor are loaded and the entire evaporator surface is active.

When the recirculated air temperature falls below the control temperature, the contacts of the thermostat 59 close and complete the battery circuit including the solenoids 38, 39 and 46 causing the solenoid 46 to close the valve 44 and thereby to shut off a portion of the evaporator surface, and causing the solenoids 38 and 39 to adjust the valves 24 and 25 respectively to close off the tubes 29 and 30 respectively, connecting with the tube 85 to the condenser 20, and to open up the tubes 32 and 33 respectively, connecting with the by-pass tube 35, thereby unloading the cylinders 1 and 2 of the compressor.

While for ease of illustration, the unloading of the compressor cylinders has been described in connection with recirculation of the refrigerant through external tubes, it is preferred that the unloading take place in the heads of the cylinders as disclosed in the E. M. Paullin, Jr. Patent No. 2,083,740 of June 15, 1937.

While one embodiment of the invention has been described for the purpose of illustration, it should be understood that the invention is not limited to the exact apparatus and arrangement of apparatus illustrated, as modifications thereof may be suggested by those skilled in the art without departure from the essence of the invention.

What is claimed is:

1. An air conditioning system for a passenger vehicle, comprising an air cooling evaporator, means including a refrigerant compressor for supplying refrigerant to said evaporator, a motor for driving said compressor, an electric battery carried by said vehicle for energizing said motor, means including a thermostat responsive to temperature changes in the passenger space for disconnecting said motor from said battery when the air has been cooled to the desired temperature, wayside connections for supplying external electric energy to said motor as when said vehicle is standing in a station, means for unloading said compressor, and means actuated when said wayside connections are completed for disconnecting said thermostat from control of said motor and for connecting said thermostat to control of said means for unloading said compressor whereby when said wayside connections are completed and the air has been cooled to the desired temperature, said motor is continually energized from said wayside connections and said thermostat acts to unload said compressor.

2. An air conditioning system for a passenger vehicle, comprising an air cooling evaporator, means including a refrigerant compressor having a plurality of cylinders for supplying refrigerant to said evaporator, means including a thermostat responsive to temperature changes in the passenger space for unloading one or more of said cylinders when the air in the passenger space has been cooled to that desired, a motor for driving said compressor, an electric battery carried by said vehicle for energizing said motor, means including a low limit thermostat responsive to temperature changes in the passenger space for disconnecting said motor from said battery when the air has been cooled to the desired low limit temperature, wayside connections for supplying external electric energy to said motor as when said vehicle is standing in a station, means for unloading the other cylinders of said compressor, and means actuated when said wayside connections are completed for disconnecting said low limit thermostat from control of said motor and for connecting said low limit thermostat to control of said means for unloading the other cylinders of said compressor whereby when said wayside connections are completed and the air has been cooled to the desired low limit temperature, said motor is continually energized from said wayside connections and said low limit thermostat acts to unload said other cylinders of said compressor.

3. An air conditioning system for a passenger vehicle, comprising a multiple section, air cooling evaporator, means including a refrigerant compressor having a plurality of cylinders for supplying refrigerant to said evaporator, means including a thermostat responsive to temperature changes in the passenger space for unloading one or more of said cylinders and for rendering one of said evaporator sections inactive when the air in the passenger space has been cooled to that desired, a motor for driving said compressor, an electric battery carried by said vehicle for energizing said motor, means including a low limit thermostat responsive to temperature changes in the passenger space for disconnecting said motor from said battery when the air has been cooled to the desired low limit temperature, wayside connections for supplying external electric energy to said motor as when said vehicle is standing in a station, means for unloading the other cylinders of said compressor, and means actuated when said wayside connections are completed for disconnecting said low limit thermostat from control of said motor and for connecting said low limit thermostat to control of said means for unloading the other cylinders of said compressor whereby when said wayside connections are completed and the air has been cooled to the desired low limit temperature, said motor is continually energized from said wayside connections and said low limit thermostat acts to unload said other cylinders of said compressor.

4. An air conditioning system for a passenger vehicle, comprising an air cooling evaporator, means including a refrigerant compressor having a plurality of cylinders for supplying refrigerant to said evaporator, a motor connected to said compressor for driving same, means including wayside connections for supplying electric power to said motor as when said vehicle is standing in a station, a thermostat responsive to changes in the temperature in the passenger space of said vehicle for controlling said temperature, means for unloading one or more of said cylinders, means actuated when said wayside connections are completed for connecting said thermostat to said last mentioned means for controlling said temperature by variably loading said compressor, means for unloading the other cylinders of said compressor, a low limit thermostat, and means actuated when said wayside connections are completed for connecting said low limit thermostat to said last mentioned means for unloading said other cylinders when said wayside connections are completed and the air in the passenger space has been cooled to the desired low limit temperature.

MILTON E. HANSON.